United States Patent [19]

Bougsty

[11] Patent Number: 4,789,224

[45] Date of Patent: Dec. 6, 1988

[54] INSTRUMENT PANEL HAVING LIGHT PIPE HAVING LEGS

[75] Inventor: Larry J. Bougsty, Holly, Mich.

[73] Assignee: General Motors Corporation, Detroit, Mich.

[21] Appl. No.: 45,463

[22] Filed: May 4, 1987

[51] Int. Cl.[4] .................. G02F 1/13; F21V 7/04; F21V 1/19

[52] U.S. Cl. .................. 350/345; 362/19; 362/31

[58] Field of Search .............. 350/334, 345; 368/30, 368/84, 242; 362/19, 26, 31

[56] References Cited

U.S. PATENT DOCUMENTS

| 3,561,145 | 3/1968 | Shotwell | 362/19 X |
| 3,654,454 | 4/1972 | Olesen | 362/19 |
| 3,863,436 | 2/1975 | Schwarzchild et al. | 350/334 |
| 4,260,224 | 4/1981 | Takayama | 350/334 X |
| 4,272,838 | 6/1981 | Kasama et al. | 368/242 X |
| 4,357,061 | 11/1982 | Crosby | 350/334 |
| 4,453,200 | 6/1984 | Troka et al. | 350/345 |

FOREIGN PATENT DOCUMENTS

| 2407738 | 8/1974 | Fed. Rep. of Germany | 350/334 |
| 0062568 | 6/1978 | Japan | 368/242 |
| 0145557 | 11/1979 | Japan | 350/334 |
| 0101521 | 6/1985 | Japan | 350/334 |
| 2121583 | 12/1983 | United Kingdom | 350/334 |

Primary Examiner—Stanley D. Miller
Assistant Examiner—David Lewis
Attorney, Agent, or Firm—F. J. Fodale

[57] ABSTRACT

An instrument panel cluster includes a printed circuit board having a plurality of liquid crystal subassemblies secured thereto, each of which includes a columnar terminal block with a beam configured light pipe cantilevered from one side of the block to locate the free end of the beam at a light source of the printed circuit board to direct light therefrom across the planar extent of an illuminating surface on the beam for backlighting a liquid crystal display; and wherein the liquid crystal display and light pipe are configured to be releasably connected to the terminal block by a spring clip means that biases the liquid crystal display against an elastomeric connector supported by the terminal block to electrically connect the liquid crystal display to a printed circuit board and thereby enabling the light pipe and liquid crystal display to be interconnected and preassembled for testing and adjustment of the light pipe with respect to the liquid crystal display prior to final assembly of an instrument panel bezel.

14 Claims, 5 Drawing Sheets

INSTRUMENT PANEL HAVING LIGHT PIPE HAVING LEGS

FIELD OF THE INVENTION

This invention relates to instrument panel assemblies and more particularly to instrument panel assemblies having a plurality of liquid crystal displays with a light pipe for backlighting the liquid crystal display from light sources that are carried by a printed circuit board that is operative to control the graphic display projected from the liquid crystal display and more particularly to such instrument panel assemblies having an instrument panel bezel that is connected with respect to the instrument clusters to form an instrument panel frame therearound.

DESCRIPTION OF THE PRIOR ART

Various devices utilize a liquid crystal display having graphics thereon that are selectively energized by printed circuit means to vary the graphic display of the liquid crystal component on the LCD device. An example of such displays is set forth in U.S. Pat. No. 4,451,121, issued May 29, 1984, which discloses a calculator that includes a printed circuit board and means for electrically connecting the printed circuit board to the LCD device to selectively vary the displayed graphics in response to operation of the calculator.

Another example of such displays is shown in U.S. Pat. Nos. 4,012,117 and 4,165,607, which show liquid crystal watch modules. An LCD device is supported by a framework which supports the side edges of the LCD and locates the terminals of the LCD with respect to an elastomeric connector for completing the electrical path between the printed circuit board and the LCD device. The printed circuit board, support frame and LCD are stacked on each other in a manner that creates tolerance stackup problems even when each of the components are made to close tolerances. Such assembled parts are not suited for use with an illuminating surface of a light pipe which requires precise location with respect to the LCD device to accurately backlight the full planar extend thereof and to assure proper eletrical connection between the terminals of the LCD device and an elastomeric connector.

Another type of device is shown in U.S. Pat. No. 4,294,517 that uses LCD displays are watch configurations that have an LCD crystal with the rear surface thereof backlighted by a light component encapsulated in a protective pod. The light source is self-luminous and requires special carrier connection and carrier medium to backlight an LCD display. The components of the device are stacked one on another and will have tolerance stack-up problems even when precision parts provide electrical contact and light transmission between the LCD device and the associated components.

LCD devices have also been used in the instrument panels of vehicles. Existing assemblies utilize elastomeric connectors which tend to skew when compressed between such LCD's and printed circuit boards. Such skewing of the elastomeric connector can limit the contact pad density or spacing of the elastomeric connector contacts. Consequently, the number of electrical leads and active LCD graphic displays are limited for a given LCD size. Additionally, in prior instrument panel configurations, the support and bezel are preassembled prior to testing display and circuit functions of the assembly and prior to checking for alignment between transflector and LCD components in the assembly. Consequently, if misalignment or circuit malfunction is detected, the whole assembly must be disconnected in order to follow repair procedures to trouble shoot for circuit malfunctions and/or to realign the transflector and LCD components to produce a desired backlighting effect. Such repair procedures are both difficult and expensive to accomplish.

SUMMARY OF THE INVENTION

The present invention simplifies assembly and testing of instrument panel assemblies having printed circuit boards with a light source and a light pipe joined thereto. In the present invention, the light pipe is operatively associated with juxtaposed liquid crystal display and transflector components. The components are supported by a connector block that is formed as a single columnar member having terminal formed in situ therein and including an open ended cavity defining a receptacle for an elastomeric connector. The columnar member has support means thereon which reference subassembled light pipe, transflector and LCD components with respect to a common datum.

The subassembled components are releasably connected to a single columnar member by means that compressively secure the elastomeric connector between the LCD and terminals in the terminal block, thereby to reduce stack-up of tolerances between the subassembled components so as to permit closer spacing of different colors on a transflector plate and a precise alignment of the transflector and LCD to assure correct color transmission between the transflector and LCD graphics.

The single columnar member further provides a location point for the light pipe, transflector and LCD components with respect to an instrument panel bezel that frames each of the individual subassemblies of the instrument cluster. Each of the aforedescribed subassembled components are assembled prior to securing the bezel portion of the instrument panel with respect thereto. Consequently, each one of the subassemblies can be electrically tested, inspected and repaired separately from one another and prior to a final assembly operation in which the bezel is fastened in place.

The single columnar member is further configured to support the elastomeric connector at a raised point with respect to the printed circuit board thereby to reduce the height of the elastomeric connector so as to maintain a height to width relationship that will reduce skewing of the elastomeric connector when the subassembled LCD, transflector and light pipe are releasably connected to the single molded plastic columnar member. Consequently, the assembly enables the use of elastomeric connectors which provide a desired contact pad density to connect non-flat connector surfaces in the terminal block with the conductive pads found on LCD display devices, while sealing between the conductive pads of the LCD and the terminal block.

Another feature of the present invention is that the instrument panel assembly includes a printed circuit board having a plurality of spaced light bulbs of the type commonly used in such assemblies.

Each of the columnar members are located in spaced relationship to the bulbs. A beam configured light pipe is cantilevered from each of the columnar members to bridge underlying circuit components on the printed circuit board. The beam also includes light cavities which concentrate light from bulbs located at a point on the printed circuit board spaced to one side of the LCD such that the depth of the display can be reduced. Each beam has a spacer leg on the unsupported end thereof, which is interlocked with the printed circuit board. The interlocking portion of the spacer leg is in the form of an offset tab which fits into an opening in the circuit board and will serve as a fulcrum to pivot the beam into a supported and referenced relationship with the columnar member.

BRIEF DESCRIPTION OF THE DRAWINGS

Other advantages of the present invention will be readily appreciated as the same become better understood by reference to the following detailed description when considered in connection with the accompanying drawings wherein.

DESCRIPTION OF THE PREFERRED EMBODIMENT

Figure 1:
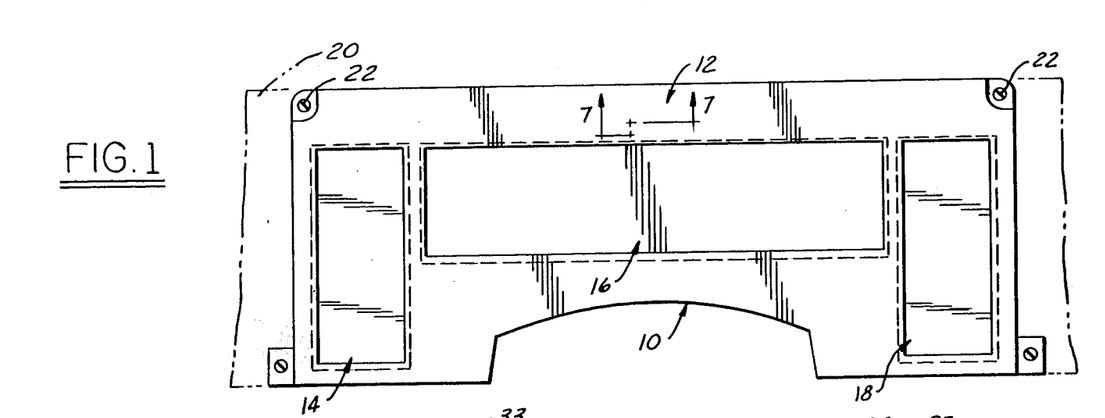
FIG. 1 is a front elevational view of an instrument panel including the display clusters of the present invention.

Referring now to FIG. 1, an instrument panel 10 is illustrated. It includes a cover bezel 12 that frames a cluster of liquid crystal display subassemblies 14, 16, and 18 (hereinafter referred to as LCD subassemblies). The bezel is connected to a support frame 20 by screws 22.

Figure 2:
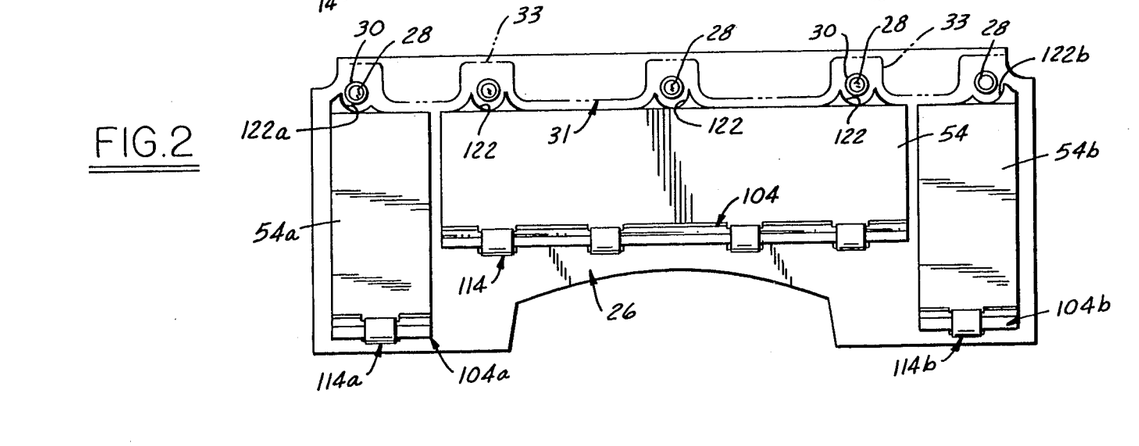
FIG. 2 is a front elevational view like FIG. 1 with a bezel of the instrument panel removed therefrom.

FIG. 2 shows the instrument panel 10 with the bezel removed to expose the upper surface 24 of a printed circuit board 26 (hereinafter referred to as the PCB 26). The circuitry of the board 26 forms no part of the present invention and can be of any architecture which will produce a desired graphics display from one or more of the aforesaid LCD subassemblies 14, 16, 18.

Figure 3:
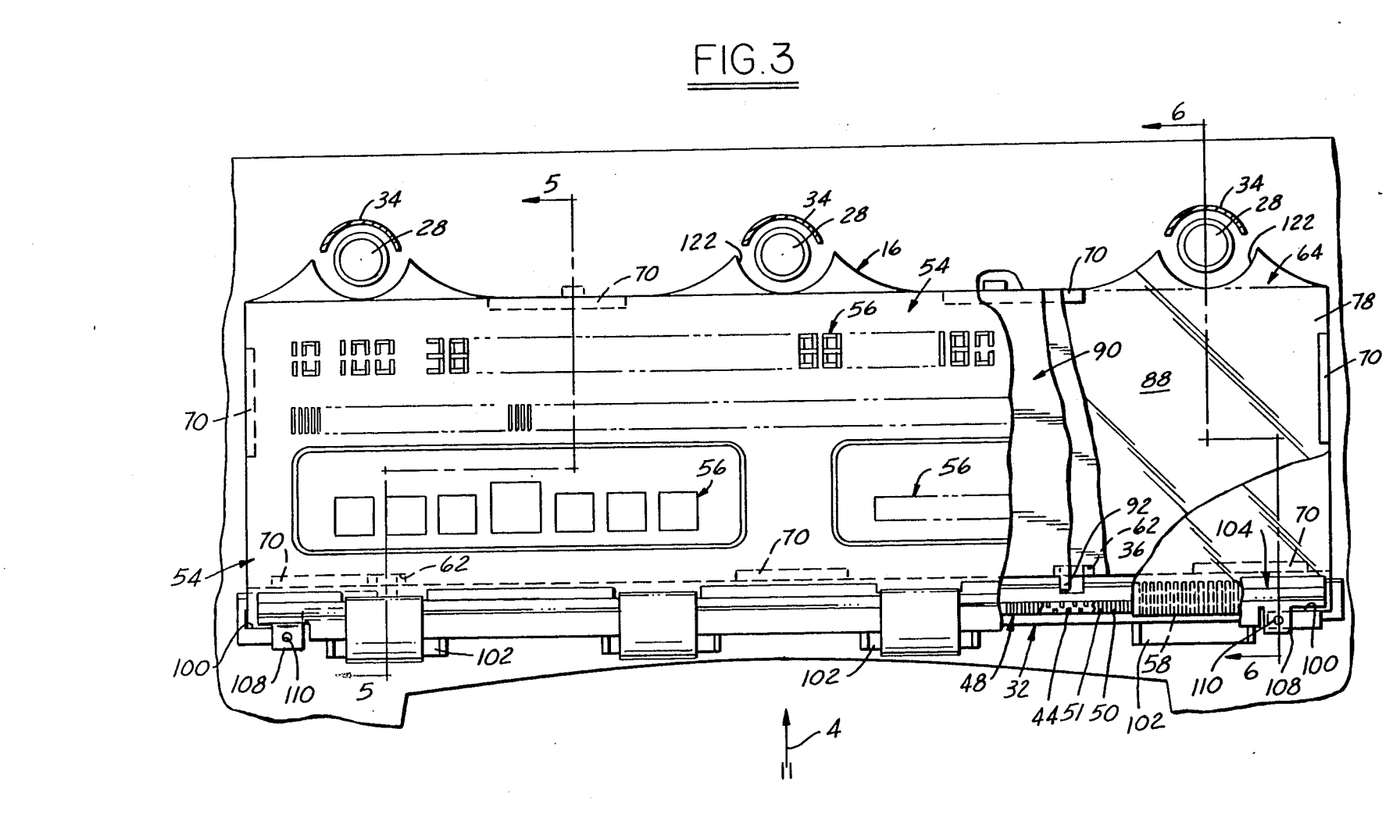
FIG. 3 is an enlarged, partly broken-away front elevational view of one of the instrument panel displays.
Figure 4:
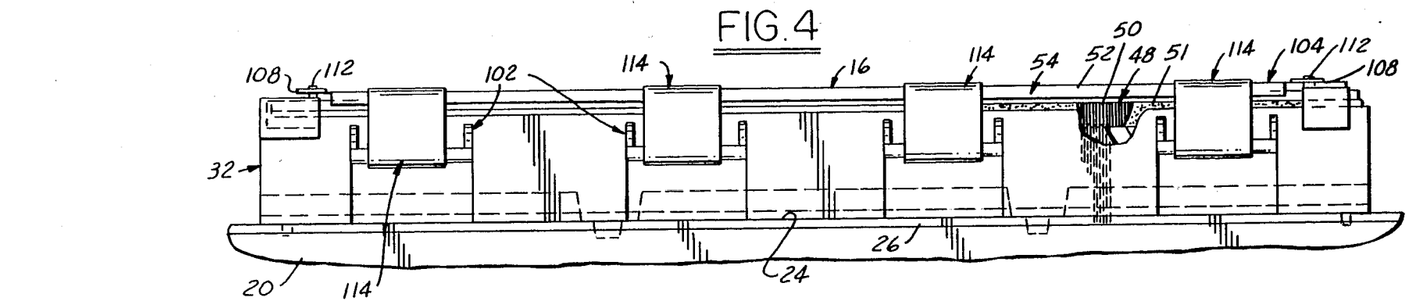
FIG. 4 is a side elevational view looking in the direction of the arrow 4 in FIG. 3.
Figure 6:
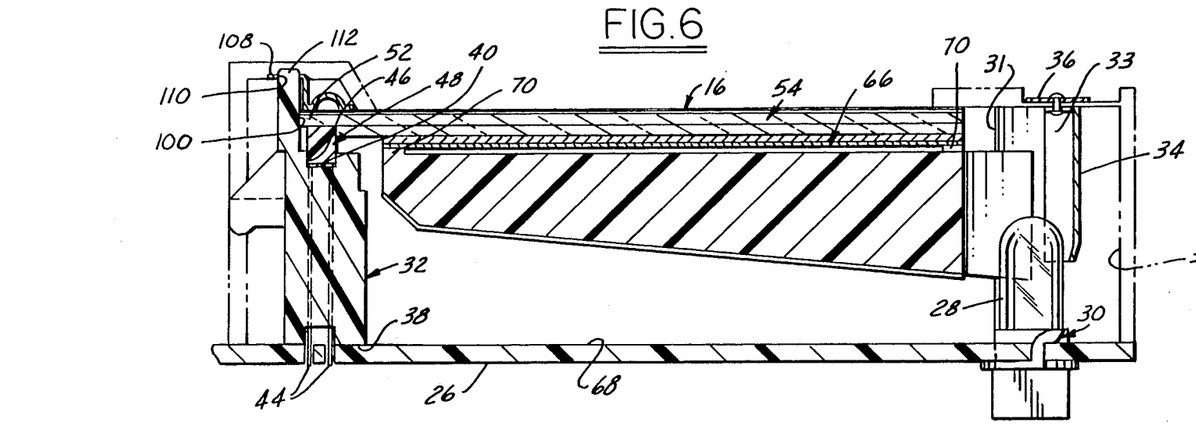
FIG. 6 is a sectional view taken along the line 6—6 of FIG. 3, looking in the direction of the arrows.
Figure 7:
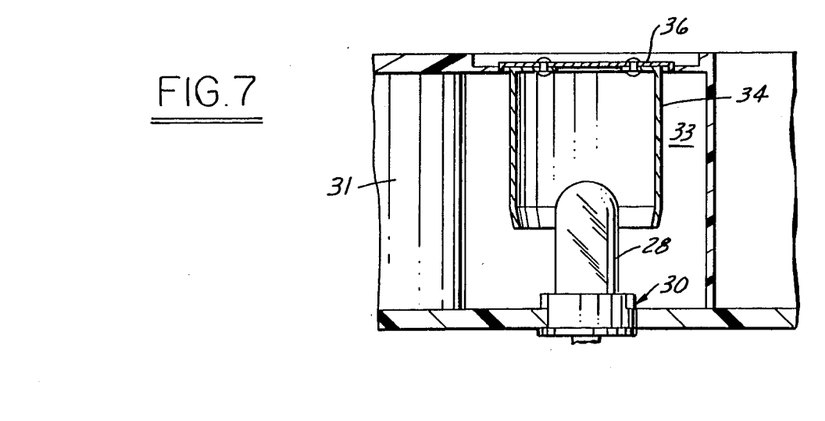
FIG. 7 is an enlarged sectional view taken along the line 7—7 of FIG. 1, looking in the direction of the arrows.

A plurality of light bulbs 28 are carried by connector receptacles 30 which interlock in the PCB 26 to electrically connect a bulb 28 with conductor strips on the PCB 26 in a known manner. The bezel 12 has a reflective inboard surface 31 which extends across the width of the bezel. The surface 31 includes recesses 33 in which light reflectors 34 are located. Each reflector 34 is fixed to a base 36 staked to the bezel 12 as shown in FIGS. 3, 6 and 7. The light bulbs 28 serve as a light source for the LCD subassemblies 14, 16, 18 for backlighting the instrument panel to illuminate graphic displays which are produced thereon in response to signals from the PCB 26.

Each of the LCD subassemblies 14, 16 and 18 include similar components which will be specifically described in the case of subassembly 16 which is shown in FIGS. 3-7. Similar components of the subassemblies 14, 18 will be identified by the same reference numeral and letters a or b, respectively.

Figure 5:
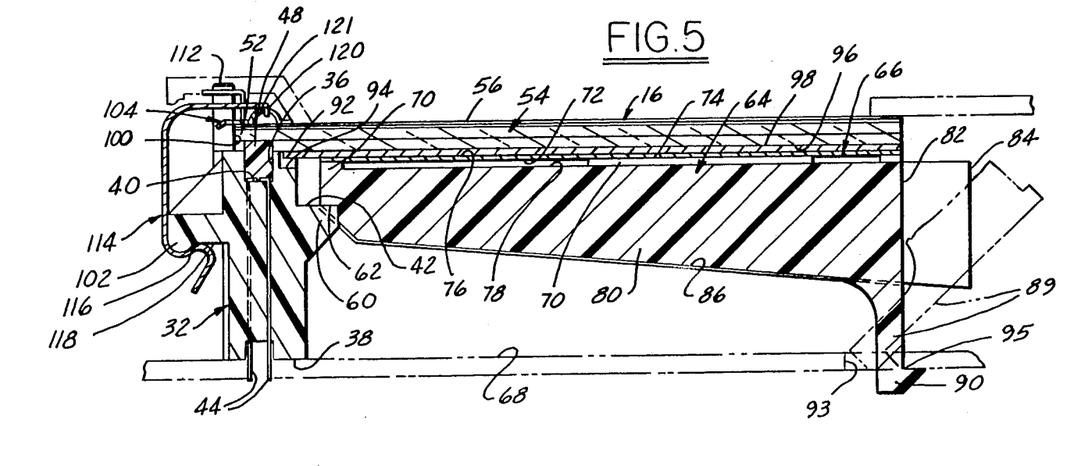
FIG. 5 is a sectional view taken along line 5—5 of FIG. 3, looking in the direction of the arrows.

The LCD subassembly 16 includes a single molded plastic columnar member or terminal block 32 at the end thereof opposite to light bulbs 28 which serve to illuminate the subassembly 16. The terminal block 32 is precisely molded to have three reference surfaces 38, 40 and 42 all on the same part. Surface 38 defines the base of the terminal block 32. It engages the PCB 26 to locate terminals 44 formed in situ in the terminal block 32 with respect to openings in the PCB 26. The terminals, best seen in FIGS. 5-7, are soldered into the PCB 26 and thereby serve to locate and attach the terminal block 32 to the PCB 26.

The terminal block surface 40 is located at the upper end of the block and defines the base of an open end cavity 46 therein. Cavity 46 supports an elastomeric connector pad 48 which has a high density of spaced electrically conductive strips 50 embedded in dielectric elastomeric matrix 51. The matrix 51 electrically insulates the conductive strips 50 from each other and will yield when an LCD board is assembled thereagainst to align terminals thereon with the conductive strips 50. The surface 40 is raised a substantial distance above the PCB 26 to reduce the bridging distance between the terminal block 32 and the underside of an extension 52 formed on an LCD board 54. Since the bridging distance is reduced, the connector pad 48 has a reduced ratio of height to width H/W. Consequently, the reliability of operation is improved since there is less skew in the conductive strips 50 when the connector pad 48 is compressed with respect to the LCD board. As a result, more conductive strips can be included in the pad 48 to service a larger number of electrical leads and more extensive graphics on the LCD board 54.

The LCD board 54 carries liquid crystal arrays 56 which are connected by board terminals 58 to be selectively driven to vary the graphics in accordance with control signals from the PCB 26.

The third reference surface 42 on terminal block 32 is defined by two spaced ledges or lands 60 extending inboard of the terminal block 32 at the upper end thereof. The lands 60 supportingly engage recessed seats 62 formed on one end of a beam 64 that is cantilevered from the terminal block as best seen in FIG. 6. As will be described, the beam 64 is made of material and configured for directing light from bulbs 28 to the LCD board 54. Furthermore, the beam supports a subassembly made up of the LCD board 54 and underlying transflector means 66 to locate them with respect to the bezel 12.

Prior art instrument panels have a tolerance stack-up problem where many parts are stacked and connected together to define the support surfaces for electrical connectors, LCD displays and light pipe components thereof. Such problems are reduced in the present invention by use of a single part with multiple reference surfaces 38, 40, 42 related to a common datum. More particularly, such surfaces reference the electrical connections in the LCD subassemblies 14, 16, 18 from a common datum surface 68 on the PCB 26 and they also reference the subassembled LCD board 54 and transflector means 66 from the same datum.

Another problem is how to test alignment of multiple parts joined together to form an integrated display package. Correct alignment of an LCD board with both light pipe backlighting and a transflector plate is required to enable closely spaced color patterns on the transflector plate to appear in proper position on the LCD board. Misalignment of the components otherwise will cause incorrect colors to be visible in the LCD graphics 56. Such aligned components hereinafter are referred to as light transmission components. While the use of a single part as a reference source reduces the likelihood of such misalignment, another problem arises if the instrument panel assembly requires that all of the component parts be secured by fasteners such as screws to carry out a final alignment check. In cases where final assembly of all component is required prior to final testing of the assembly, repair and adjustment of misaligned parts and trouble shooting of graphics errors can be difficult and expensive.

Another problem arises if the instrument panel cover or bezel must be fastened in place in order to check alignment of the light transmission components of the assembly. If the light transmission components are misaligned, the fasteners that join the finally assembled bezel must be removed. The light transmission components are then realigned on a trail and error basis and reassembled and refastened for subsequent testing. Such repair is both expensive and unpredictable.

Accordingly, the present invention provides an improved assembly of the LCD board 54 and transflector means 66. To accomplish such assembly, the beam 64 includes a plurality of upper peripheral lands 70 that engage a light reflective surface 72 of a transflector sheet 74. The opposite surface 76 of sheet 74 has light transmissive properties. Thus, ambient light directed against the LCD board 54 will be directed from the reflective surface 72 to illuminate the board 54 such that display characters on the LCD board 54 will appear darker and the background appears brighter to a daytime observer. Illuminating surface 78 of a light pipe 80 in the beam 64 underlies surface 76 and will backlight the LCD board when the light bulbs 28 are illuminated.

The light pipe 80 further includes an illuminated surface 82 at the free end 84 of the cantilevered beam 64. A light reflective coating 86 covers the bottom of the beam to transmit light from surface 82 to surface 78. The beam 64 has a progressively reduced cross-section from its free end to its supported end to produce uniform light intensity through the planar extent 88 of the illuminating surface 78. The beam 64 has a spacer leg 89 on its opposite end of a height which will position the beam 64 above the reference surface 68 of the PCB 26. Thus, the LCD subassembly 16 is spaced from the discrete circuit elements on the PCB 26. The spacer leg 89 has a locator tab 91 on its end which inserts through a reference hole 93 in the PCB 26 when the beam 64 is tilted with respect thereto as outlined in broken lines in FIG. 6. The tab 91 defines a corner 95 which serves as a fulcrum to pivot the beam 64 until the recessed seats 62 are supportingly received on the lands 60.

The transflector sheet 74 has a light polarizer sheet 90 juxtaposed thereagainst. The polarizer sheet 90 has indexing tabs 92 that fit into grooves 94 in the terminal block 32 above the reference surface 42. The underside 96 of the LCD board 54 is juxtaposed against the upper surface 98 of the polarizer sheet 90 and an end surface of the LCD board 54 engages a wall 100 of the cavity 46 to align the board 54 with respect to the terminal block 32 in overlying relationship to the elastomeric connector 48. The LCD board 54 is simultaneously aligned with the lighting components therebelow.

The subassembled beam 64, polarizer sheet 90, transflector sheet 74, and LCD board 54 are releasably secured to the terminal block 32 in a manner which enables them to be electrically completed with components of PCB 26 and which enables them to be tested prior to fastening the bezel 12 to the support frame 20. The means for releasably connecting the parts includes a reaction flange 102 that extends in an outboard direction from the terminal block. A protector strip 104 covers the outer surface 106 of the LCD extension 52. It includes locator tabs 108 at its opposite ends with holes 110 that fit over raised locating pins 112 on the terminal block 32. The strip 104 has a length which corresponds to that of the elastomeric connector pad 48 and thereby serves to apply a biasing force thereagainst from a spring clip 114 which has a bent end 116 engaged wit the under surface 118 of the reaction flange 102 and a snap edge 120 which is fastened against a raised edge 121 on the strip 104.

The aforedescribed spring clip 114 holds all of the components in a light transmitting relationship and in an electrically completed relationship so that a full testing sequence can be carried out to evaluate the operation of the graphics display of each of the LCD subassemblies 14, 16, 18.

The operation of each of the LCD subassemblies 14, 16, 18 includes energizing the light bulbs 28. The bulbs are located in cavities 122 formed in the pipe 64 on either side of the spacer leg 89. Cavities 122 capture the light from the bulbs 28 and the configured light pipe in the beam 64 will direct the light to illuminating surface 78. The graphics of the LCD subassemblies are displayed an the alignment of the transflector and LCD board can be checked by observing the color alignment patterns on the display. If any one or more of the subassemblies are misaligned they can be readily adjusted by disconnecting the spring clip 114 on a given subassembly and adjusting the stacked, juxtaposed parts. The adjustment will take place without having to disconnect circuit components. The adjusted stacked parts will be electrically connected and referenced with respect to the PCB 26 once the spring clip 114 is refastened.

Figures 8, 9:
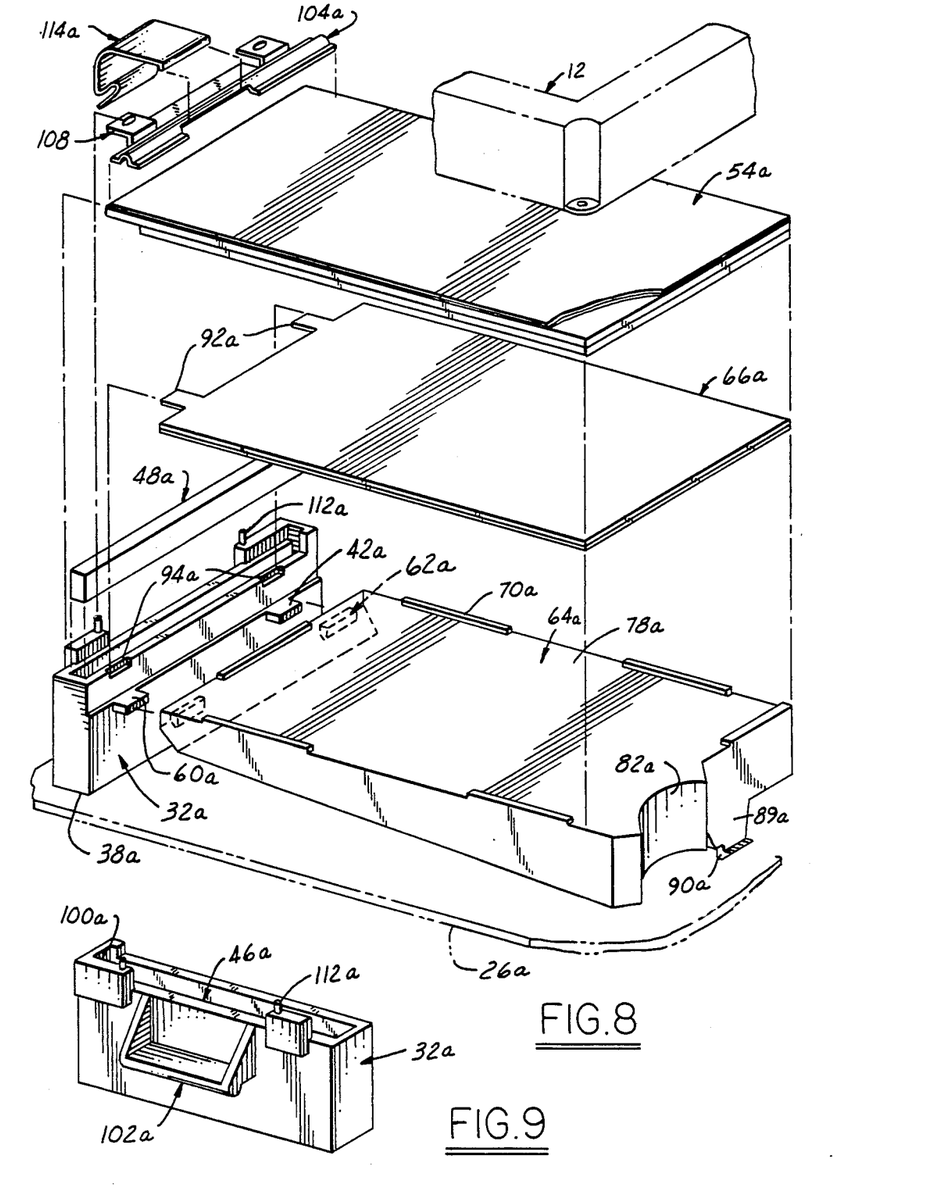
FIG. 8 is an exploded perspective view of another one of the instrument panel displays.
FIG. 9 is a perspective view of the outboard surface of a terminal block of the panel display in FIG. 8.

FIG. 8 shows an exploded view of subassembly 14. It has a columnar member or terminal block 32a which is shorter than terminal block 32. Otherwise it is the same. Terminal block 32a carrier a light pipe beam 64a which is cantilevered and supported on the PCB 26 in the same way as beam 64, but of different dimensions. An LCD board 54a and transflector means 66a are also illustrated. They are supported in the same way as their counterparts in subassembly 16 but are of different dimensions. A spring clip 114a joins the parts together as in the case of subassembly 16. In order to avoid redundant descriptive text, the other key components of subassembly 14 and 18 are marked with corresponding reference numerals with it being understood that their function and form correspond to the aforesaid description.

Although the present invention has been described with respect to instrument panel assemblies, it is not so limited. For example, it has equal applicability to advertising display or other devices in which graphics are usefully backlighted by light pipes and controlled by circuit boards. Furthermore, while the invention has been explained with respect to certain specific embodiments, it is understood that other uses are possible and that various modifications and substitutions can be made within the scope of the appended claims.

I claim:

1. In an instrument panel assembly having a printed circuit board, with a light source and a light pipe joined thereto, the light pipe being operatively associated with juxtaposed liquid crystal display and transflector components and a terminal block supporting the transflector and light pipe with respect to the printed circuit board the improvement comprising:

said terminal block being a columnar member having terminals formed in situ therein and having first and second reference surfaces thereon one of which reference surfaces engages said printed circuit board to fix the second reference surface thereon in a predetermined spatial relationship with respect to said printed circuit board;

a beam cantilevered from one side of said columnar member, said beam including light pipe means, said light pipe means having an illuminated surface and an illuminating surface thereon, a spacer leg on one end of said beam engaging the printed circuit board to space said light pipe from said printed circuit board, said spacer leg having a tab on its end that engages the printed circuit board and defines a fulcrum to pivot said beam into a supported relationship with said second reference surface;

said illuminated surface located at a light source on said printed circuit board;

means on said beam engaging said second reference surface to locate said illuminating surface precisely with respect to the liquid crystal display;

and fastener means for releasably securing said beam and said liquid crystal display to said columnar member whereby the light transfer relationship between said beam and said liquid crystal display can be tested and adjusted prior to final assembly of the instrument panel.

2. In the combination of claim 1, a third reference surface located a greater distance from said printed circuit board than said second reference surface so as to reduce the spatial distance between said liquid crystal display and said third reference surface;

a low-profile elastomeric connector having conductive segments therein supported by said third reference surface and bridging between said terminal block and said liquid crystal display and compressed by said fastener means to provide electric connection between said printed circuit board and said liquid crystal display; said elastomeric connector having a height to width relationship that will minimize skewing of said conductive segments when compressed by said fastener means thereby to maintain electrical continuity between the printed circuit board and the liquid crystal display.

3. In the combination of claim 1, said beam having spacer lands thereon;

a transflector plate supported on said spacer lands to be located by said second reference surface of said terminal block means in parallelism with said liquid crystal display.

4. In the combination of claim 1, said terminal block having spaced lands on one side thereof, seats formed on said beam located in interlocking engagement with said lands to reference said beam and components supported thereon as a subassembly on said terminal block, said terminal block further including a reaction flange on the opposite side thereof, said fastener means including a spring clip grounded on said reaction flange and with respect to said liquid crystal display for biasing it toward said terminal block to complete an electrical path between the printed circuit board and the liquid crystal display for pretesting the graphics thereof prior to final assembly of the instrument panel.

5. In a visible display having a printed circuit board, with a light source and a light pipe joined thereto operatively associated with juxtaposed liquid crystal display and transflector components and wherein the liquid crystal display, transflector and light pipe are supported with respect to the printed circuit board the improvement comprising:

terminal block means having electrical conductors formed in situ and including an elastomeric connector supported thereon to be in electrical contact with said in situ conductors;

subassembled liquid crystal display and transflector means;

said light pipe having opposite ends, one of said ends including a spacer leg inserted into said printed circuit board to locate the other end thereof in supported engagement with said terminal block means to position an illuminating surface for lighting the subassembled liquid crystal display and transflector means prior to final assembly of the visible display to permit adjustment of the transflector and liquid crystal display components prior to such final assembly.

6. In the combination of claim 5, said terminal block means being a columnar member, means including said terminal block means for electrically connecting said liquid crystal display to the printed circuit board, and spring clip means to releasably secure said liquid crystal display to said columnar member for pretesting and adjusting it with respect to said transflector means.

7. In the combination of claim 5, said light pipe having spacer lands thereon;

a transflector plate supported on said spacer lands to be located by said terminal block means in precise juxtaposed relationship with said liquid crystal display;

a bezel having an opening therein to receive said subassembly; and means to selectively connect said subassembly to said printed circuit board for testing the operation of the graphics on saod liquid crystal display prior to mechanical connection of said bezel thereby to check and adjust the transflector to liquid crystal display alignment established following connection for testing.

8. In the combination of claim 5, said terminal block means including a plurality of separate terminal blocks, a light pipe on each of said terminal blocks, a plurality of subassembled liquid crystal display and transflector components, each of said terminal blocks being a columnar member, means including said terminal block means for electrically connecting said liquid crystal display to the printed circuit board, and said clip means to releasably secure each of said liquid crystal displays to said columnar member for pretesting and adjusting them with respect to said transflector components.

9. In an instrument panel cluster having a subassembled printed circuit board, with a plurality of subassemblies each including a light pipe, a transflector and a liquid crystal display with respect to the printed circuit board the improvement comprising:

each of said subassemblies having a terminal block having terminals formed in situ and having one end thereof directed through the printed circuit board and the opposite end thereof exposed on an upper surface of said terminal block, an elastomeric connector supported on the upper surface of the terminal block, said surface being raised a substantial distance above the printed circuit board to reduce the bridging distance between the terminal block and the liquid crystal display whereby the elastomeric connector has a reduced height to width ratio that will prevent significant skewing of the elastomeric connector when it is pressed into electrical contact with the liquid crystal display;

and means for connecting the liquid crystal display, transflector and light pipe as a preassembled unit on each of said terminal blocks for pretesting the juxtaposed relationship of said liquid crystal displays and the transflectors, said last mentioned means including a spacer leg on said light pipe that includes means to connect said light pipe to the printed circuit board and to allow said light pipe and transflector and liquid crystal display supported thereon to be reference with respect to said terminal block;

and fastener means for releasably connecting one end of said liquid crystal display, transflector and light pipe to said terminal block to complete the electrical connection through said elastomeric connector for testing the graphic display on each of the subassemblies prior to final assembly of an instrument panel bezel.

10. In the combination of claim 9, said fastener means including flange means on each of said terminal blocks and a spring clip having one end in engagement with said flange means and another end adapted to impose a force on the liquid crystal display to locate it in electrical engagement with said elastomeric connector so as to compress it into engagement with said in situ terminals of said terminal block.

11. In an instrument panel assembly having a printed circuit board, with a light source and a light pipe joined thereto, the light pipe being operatively associated with juxtaposed liquid crystal display and transflector components and a terminal block supporting the transflector and light pipe with respect to the printed circuit board the improvement comprising:

a light pipe beam having an illuminated surface and an illuminating surface thereon, a spacer leg on one end of said beam engaging the printed circuit board to space said light pipe from said printed circuit board, said spacer leg having a tab on its end that engage the printed circuit board and defines a fulcrum to pivot said beam into a supported relationship with the terminal block;

said illuminated surface including a cavity enclosing a light source on said printed circuit board, a reflector for directing light from said light source to said cavity;

means on said beam engaging the terminal block to locate said illuminating surface precisely with respect to the liquid crystal display;

and fastener means for releasably securing said beam and said liquid crystal display to the terminal block whereby the light transfer relationship between said beam and said liquid crystal display can be tested and adjusted prior to final assembly of the instrument panel.

12. In the combination of claim 11 said terminal block having spaced lands on one side thereof, seats formed on said beam located in interlocking engagement with said lands to reference said beam and components supported thereon as a subassembly on said terminal block, said terminal block further including a reaction flange on the opposite side thereof, said fastener means including a spring clip grounded on said reaction flange and with respect to said liquid crystal display for biasing it toward said terminal block to complete an electrical path between the printed circuit board and the liquid crystal display for pretesting the graphics thereof prior to final assembly of the instrument panel.

13. In a visible display having a printed circuit board, with a light bulb and a light pipe joined thereto operatively associated with juxtaposed liquid crystal display and transflector components and wherein the liquid crystal display, transflector and light pipe are supported with respect to the printed circuit board the improvement comprising:

terminal block means having electrical conductors and including an elastomeric connector supported thereon to be in electrical contact with said in situ conductors and the liquid crystal display for connecting it to the printed circuit board;

subassembled liquid crystal display and transflector means;

said light pipe having opposite ends, one of said ends including a spacer leg inserted into said printed circuit board to locate the other end thereof in supported engagement with said terminal block means to reference an illuminating surface for lighting the subassembled liquid crystal display and transflector means prior to final assembly of the visible display to permit adjustment of the transflector and liquid crystal display components prior to such final assembly;

said illuminated surface including a cavity enclosing a light bulb which is at a point spaced from the terminal block means and which is raised from the printed circuit board; and means for locating a reflector behind said light bulb to redirect light from said light bulb to said cavity.

14. In the combination of claim 13, said terminal block means being a columnar member, means including said terminal block means for electrically connecting said liquid crystal display to the printed circuit board, and spring clip means to releasably secure said liquid crystal display to said columnar member for pretesting and adjusting it with respect to said transflector means.

* * * * *